United States Patent
Guerra

(10) Patent No.: US 11,609,104 B2
(45) Date of Patent: Mar. 21, 2023

(54) ANGULAR POSITION SENSOR

(71) Applicant: Continental Automotive GmbH, Hannover (DE)

(72) Inventor: Daniel Guerra, Toulouse (FR)

(73) Assignee: Continental Automotive GmbH

(*) Notice: Subject to any disclaimer, the term of this patent is extended or adjusted under 35 U.S.C. 154(b) by 0 days.

(21) Appl. No.: 17/499,118

(22) Filed: Oct. 12, 2021

(65) Prior Publication Data

US 2022/0136867 A1    May 5, 2022

(30) Foreign Application Priority Data

Nov. 5, 2020  (FR) ...................................... 2011356

(51) Int. Cl.
 *G01D 5/20*   (2006.01)
(52) U.S. Cl.
 CPC .................................. *G01D 5/2046* (2013.01)
(58) Field of Classification Search
 CPC .................................................... G01D 5/2046
 See application file for complete search history.

(56) References Cited

U.S. PATENT DOCUMENTS

| | | | | |
|---|---|---|---|---|
| 4,496,831 A * | 1/1985 | Swartz | ............... | G06K 7/10633 |
| | | | | 235/462.07 |
| 4,752,732 A | 6/1988 | Van Schoiack et al. | | |
| 2005/0258786 A1 * | 11/2005 | Kellogg | ................. | H02K 29/08 |
| | | | | 318/400.4 |
| 2008/0054911 A1 * | 3/2008 | Pchelnikov | .......... | G01D 5/2225 |
| | | | | 324/635 |
| 2009/0015250 A1 * | 1/2009 | Sunier | .................. | G01R 33/028 |
| | | | | 324/244 |
| 2015/0130444 A1 * | 5/2015 | Goto | ........................ | G01D 5/14 |
| | | | | 324/207.15 |

FOREIGN PATENT DOCUMENTS

| | | |
|---|---|---|
| EP | 2853861 A1 | 4/2015 |
| JP | 08205502 A | 8/1996 |

OTHER PUBLICATIONS

French Search Report and Written Opinion for French Application No. 2011356, dated Jun. 18, 2021, with partial English translation 14 pages.

* cited by examiner

*Primary Examiner* — Alesa Allgood
(74) *Attorney, Agent, or Firm* — RatnerPrestia

(57) ABSTRACT

An angular position sensor for sensing the angular position of a rotor rotating on an axis relative to a stator, including a ferromagnetic target, of substantially ovoid cross section, rotating together with one from among the rotor or the stator, and a sensitive element including a first set of coils that are angularly evenly distributed, rotating together with the other from among the rotor or the stator, the coils being axially arranged in line with the target in order to be able to measure a distance from the target so as to deduce therefrom an angular position of the rotor relative to the stator.

12 Claims, 4 Drawing Sheets

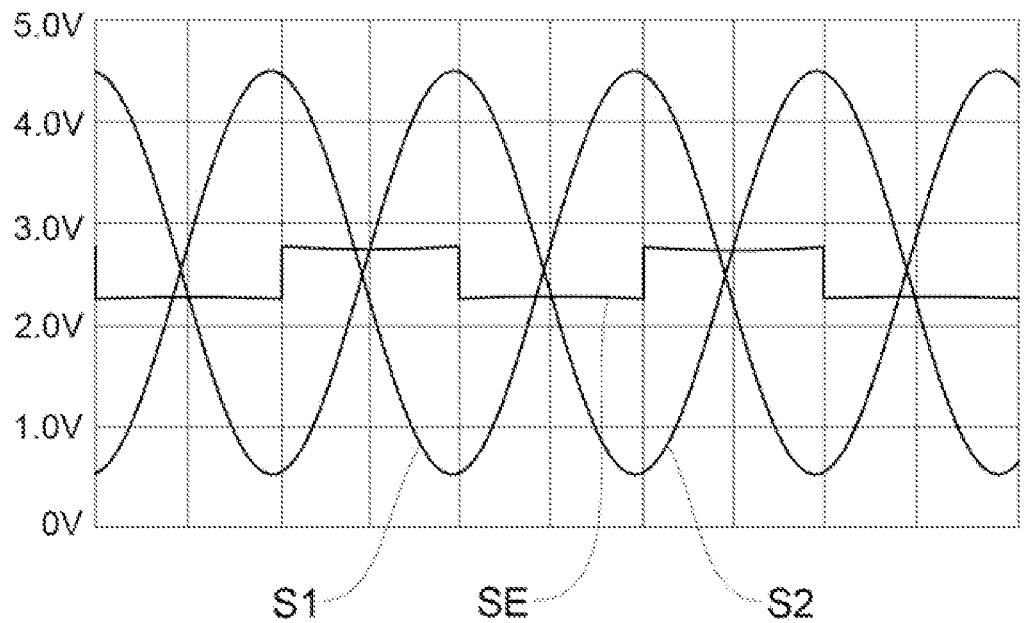
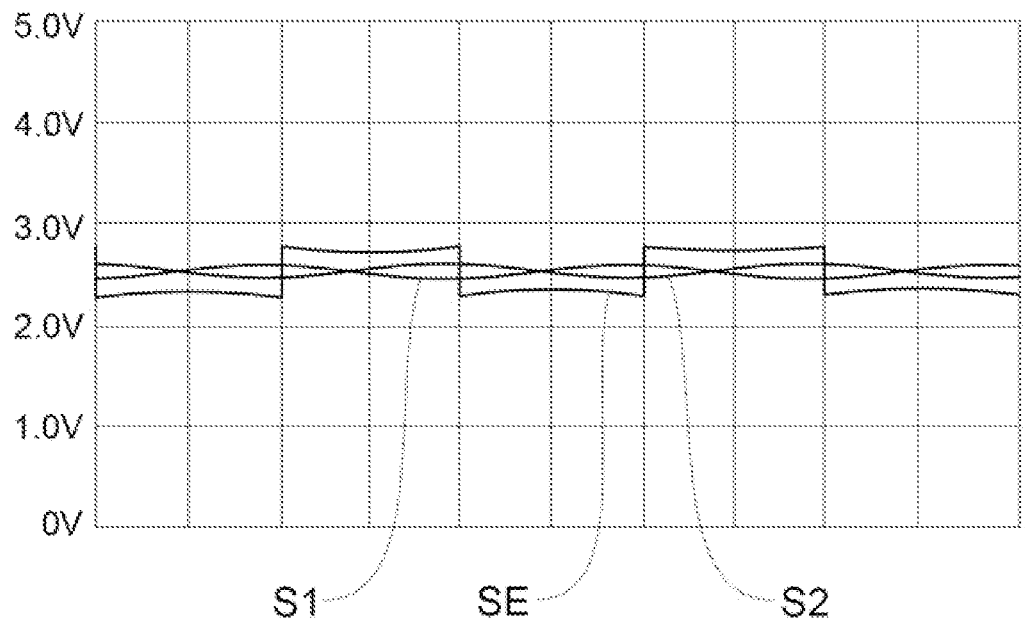

ANGULAR POSITION SENSOR

CROSS REFERENCE TO RELATED APPLICATIONS

This application claims priority to French Patent Application No. 2011356, filed Nov. 5, 2020, the contents of such applications being incorporated by reference herein.

FIELD OF THE INVENTION

The invention relates to an angular position sensor.

BACKGROUND OF THE INVENTION

To measure an angular position, for example, of a rotor relative to a stator, it is known practice to employ a resolver. Such a resolver comprises a primary coil borne by the rotor. This primary coil requires a complex supply/excitation circuit. The stator comprises at least a first secondary coil. This first secondary coil sees at its terminals a voltage that varies sinusoidally according to the angular position of the primary coil and of the rotor. Advantageously, the stator comprises a second secondary coil, offset by an angle, advantageously by 45° or 90°. This second secondary coil sees at its terminals a voltage similar to the voltage of the first secondary coil, quadrature phase-shifted with respect to said angle. Thus, the amplitude of the signal of the first secondary coil is indicative of the sine and the amplitude of the signal of the second secondary coil is indicative of the cosine of an angle of the angular position of the rotor relative to the stator.

Such a resolver has a high cost. In addition, it is difficult to integrate because of its substantial bulk. Another drawback is its lack of an alternative supply solution.

It is also known practice to use an anisotropic magnetoresistance, AMR, sensor or a tunnel magnetoresistance, TMR, sensor. Such a sensor is able to detect the position of a magnet. Thus, a magnetic target is installed, typically on the periphery of the rotor, and an AMR or TMR sensor is able to detect the angular position of said magnetic target.

The use of an additional magnet leads to a substantial additional cost, in terms of both material and integration.

Thus, an alternative solution is sought which makes it possible to measure an angular position.

SUMMARY OF THE INVENTION

To that end, one aspect of the invention is an angular position sensor for sensing the angular position of a rotor rotating on an axis relative to a stator, comprising a ferromagnetic target, of substantially ovoid cross section, rotating together with one from among the rotor or the stator, and a sensitive element comprising a first set of coils that are angularly evenly distributed, rotating together with the other from among the rotor or the stator, the coils being arranged in line with the target in order to be able to measure a distance from the target so as to deduce therefrom an angular position of the rotor relative to the stator.

Particular features or embodiments, which may be used alone or in combination, are:
the cross section of the target comprises a number of protuberances equal to half of the cardinality of a set;
the sensitive element further comprises a second set of coils, of the same cardinality as the first set, the coils of the second set being angularly evenly distributed with respect to one another and angularly interposed midway between the coils of the first set;
the coils are arranged radially, relative to the axis;
the coils of a set are connected in magnetic series;
the cross section of the target has two symmetrical protuberances;
the cardinality of the first set or of the second set, is equal to 4, and the coils of the first set or the coils of the second set, respectively, are connected in a Wheatstone bridge,
the Wheatstone bridge is supplied, between two first diagonal points, with two squarewave signals in phase opposition;
the measurement is taken, on the Wheatstone bridge, between two second diagonal points, distinct from the two first diagonal points;
the sensor further comprises a differential amplifier, for processing the measurement taken between the two second diagonal points;
the sensor further comprises a resonator, comprising a first capacitor arranged between the two second diagonal points, and a second capacitor arranged between the first two diagonal points;
the coils are surface-mount, SMD, coils mounted on a printed circuit, arranged perpendicular to the axis;
the sensor further comprises a resolver-type measurement processing unit.

In a second aspect of the invention, a DC brushless motor assembly, comprising a DC brushless motor and such an angular position sensor.

BRIEF DESCRIPTION OF THE DRAWINGS

Aspects of the invention will be better understood from reading the following description, given solely by way of example, and with reference to the appended drawings, in which:

FIGS. 5-7 show the measurement signals obtained for the angular positions 0°, 45°-Δ and 90°.

DETAILED DESCRIPTION OF THE PREFERRED EMBODIMENTS

Figure 1:
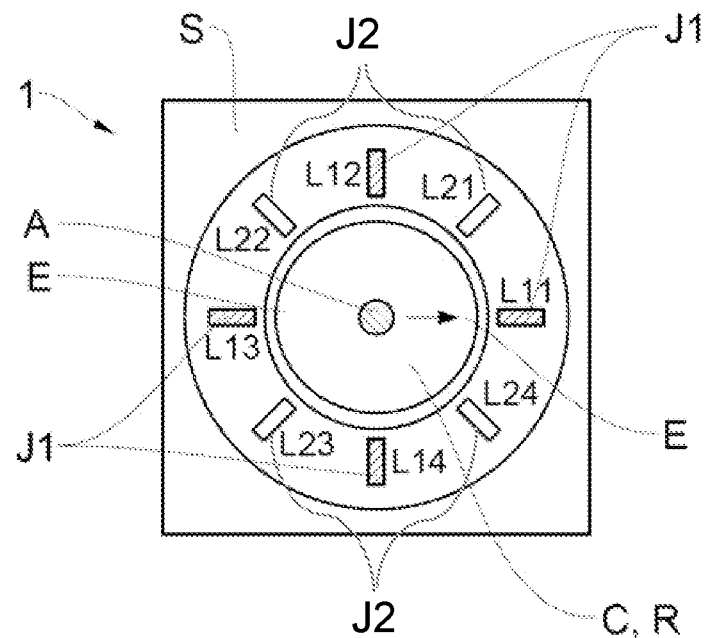
FIG. 1 illustrates, seen at the end of the shaft, the arrangement of the coils.

As illustrated in FIG. 1, an angular position sensor 1, able to measure the relative angular position between a rotor R and a stator S, the rotor R and the rotation having an axis A, comprises a target C on the one hand and a sensitive element on the other hand. The target C is ferromagnetic, for example made of steel, in order to vary the magnetic field in a coil and has a cross section, relative to the axis A, that is ovoid. This target C rotates together with the rotor R, as shown in FIG. 1 or, according to an alternative embodiment, rotates together with the stator S. The sensitive element comprises a first set J1 of coils L11, L12, L13, L14. The set J1 rotates together with the stator S, as shown in FIG. 1 or, according to the alternative embodiment, rotates together with the rotor R. Preferably, the target C rotates together with the rotor R. Specifically, it is easier to connect the coils L11, L12, L13, L14 to processing electronics from the stator. The coils L11, L12, L13, L14 are angularly evenly distributed around the shaft A, i.e. every 360°/n where n is the number of coils/cardinality of a set. Thus 2 (n=2) coils are arranged at 180°, diametrically opposite one another. 3 (n=3) coils are arranged at 120°. 4 (n=4) coils, as shown, are arranged at 90°. 8 (n=8) coils are arranged at 45°. The coils L11, L12, L13, L14 are axially arranged in line with the target C in order to be able to measure a distance from the target C and its variation in order to deduce therefrom an angular position of the rotor R relative to the stator S.

The cross section of the target C has a variable radius so that the air gap, as seen by a coil, varies continuously with the angular position. This cross section is advantageously repeated over a certain axial length, sufficient to be seen by the coils and allowing a possible axial offset of the coils to be tolerated. However, the coils are theoretically all arranged on one and the same cross section, in the same plane.

The fact that the target C is passive, in comparison with a resolver, where the equivalent of the target is the primary coil, makes it possible to omit an expensive excitation circuit for said primary coil. This excitation circuit comprises a sinusoidal voltage generator typically comprising an audio amplifier. An aspect of the invention makes it possible to omit such a circuit and reduce the cost accordingly.

The radius of the cross section of the target C preferably varies continuously in order to produce a continuous variation of the measurement. The measurement is advantageously sinusoidal, despite the magnetic variation being quadratic.

The radius of the cross section of the target C varies between a minimum value and a maximum value, where the target C has a protuberance E. According to another feature, the target C comprises a number of protuberances E equal to half of the cardinality n of a set J1, J2. Thus, in the example illustrated, the target C comprises 2 protuberances E and each set J1, J2 comprises 4 coils. According to one embodiment, the cross section of the target C is ellipsoidal.

Thus, theoretically, the principle of an aspect of the invention is applicable to a sensor comprising a target C exhibiting a single protuberance E with at least one set J1, J2 of coils comprising 2 coils. Such an embodiment complicates the production of the target C which has an eccentric cam shape. The presence of 2 coils per set J1, J2 significantly decreases the sensitivity of the sensor. In addition, 2 coils prohibit the highly advantageous feature described above of the Wheatstone bridge.

This feature also has the consequence that the cardinality of a set J1, J2 is necessarily even.

According to another feature, the sensitive element further comprises a second set J2 of coils L21, L22, L23, L24. The cardinality of the second set J2 is identical to the cardinality of the first set J1. The coils L21, L22, L23, L24 of the second set J2 are, like the coils of the first set J1, angularly equally distributed with respect to one another. In addition, they are angularly interposed midway between the coils L11, L12, L13, L14 of the first set J1. Thus, each coil L21, L22, L23, L24 of the second set J2 is arranged midway between two coils of the first set J1. Thus, the second set J2 is angularly offset by 360°/2n relative to the first set J1. Thus, for a configuration with n=4 coils per set J1, J2, the 4 coils of the second set J2 are arranged at 45° from the 4 coils of the first set J1.

According to another feature, the coils L11, L12, L13, L14, L21, L22, L23, L24 are arranged so as to have maximum sensitivity to the variation in the air gap or in the distance from the target C. This is obtained with a radial arrangement, the axis of a coil being arranged radially relative to the axis A.

Likewise, there is the question of the physical direction/orientation of the coils of the same set J1, J2. It is possible to arrange the coils of one and the same set J1, J2 in a configuration where all of the coils of the set J1, J2 have the same magnetic polarity, i.e. in magnetic series. Alternatively, with the cardinality n being even, it is possible to alternate the magnetic polarity of one coil out of every two, within the same set J1, J2, in a configuration in magnetic opposition. Both configurations, in magnetic series or in magnetic opposition, are possible and functional. However, a simulation has shown that better sensitivity of the sensor is obtained for connection of the coils of one and the same set J1, J2 in magnetic series. Thus, this configuration is preferred.

Figure 2:
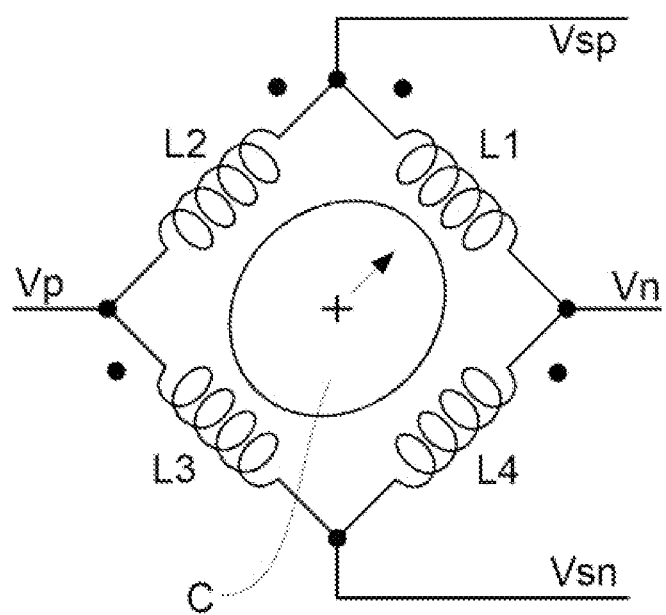
FIG. 2 illustrates the wiring of the coils of a set.
Figure 4:
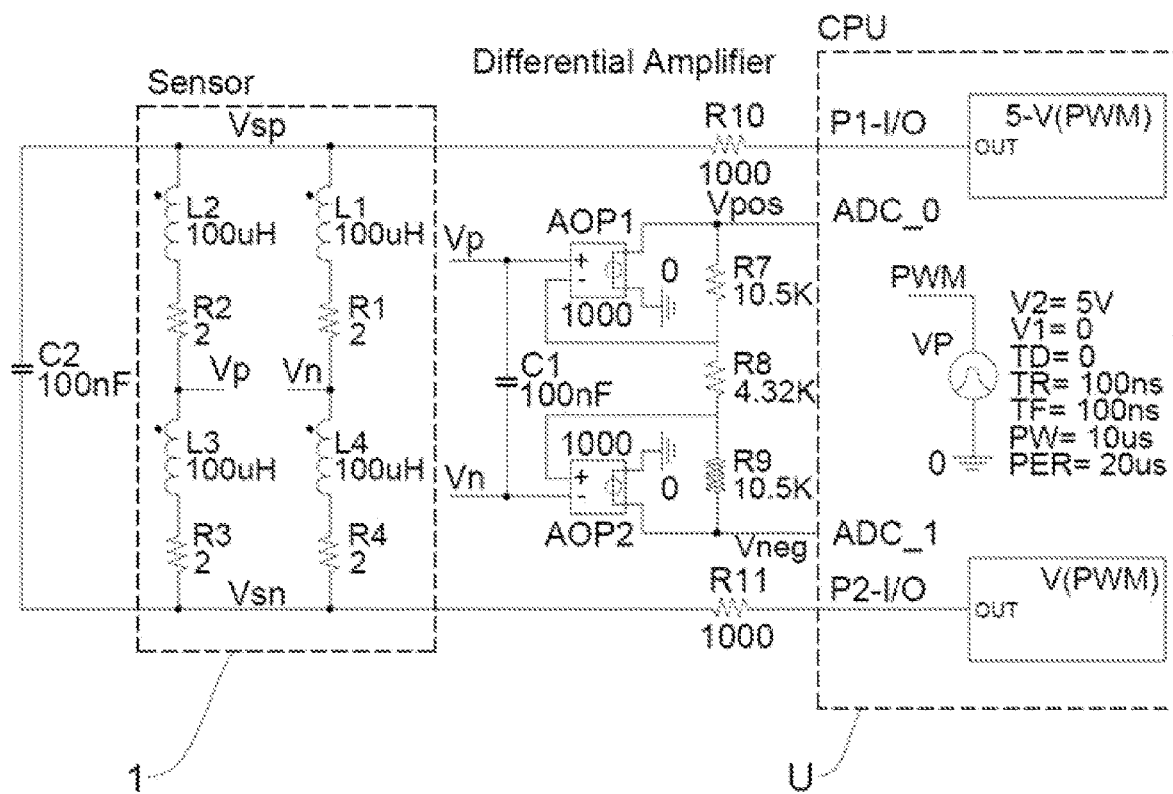
FIG. 4 illustrates the detailed wiring.

In the diagrams of FIGS. 2 and 4, the dots marked next to the coils L1, L2, L3, L4 mark the ends of the coils facing the target C.

According to another feature, the cross section of the target C has 2 symmetrical protuberances E. This preferred configuration is that illustrated in FIG. 1. Symmetry requires that the 2 protuberances be identical and diametrically opposed. The section is here advantageously ellipsoidal.

Advantageously, the cardinality of the first set J1 is equal to 4. Thus, the cardinality of the second set J2 is equal to 4. According to another particularly advantageous feature, the 4 coils L11, L12, L13, L14 of the first set J1 are connected in a Wheatstone bridge. Likewise, advantageously, the 4 coils L21, L22, L23, L24 of the second set J2 are connected in a Wheatstone bridge.

In FIGS. 2 and 4, the 4 coils are denoted by L1, L2, L3, L4 and respectively represent the coils L11, L12, L13, L14 of the first set J1 or the coils L21, L22, L23, L24 of the second set J2.

Figure 3:
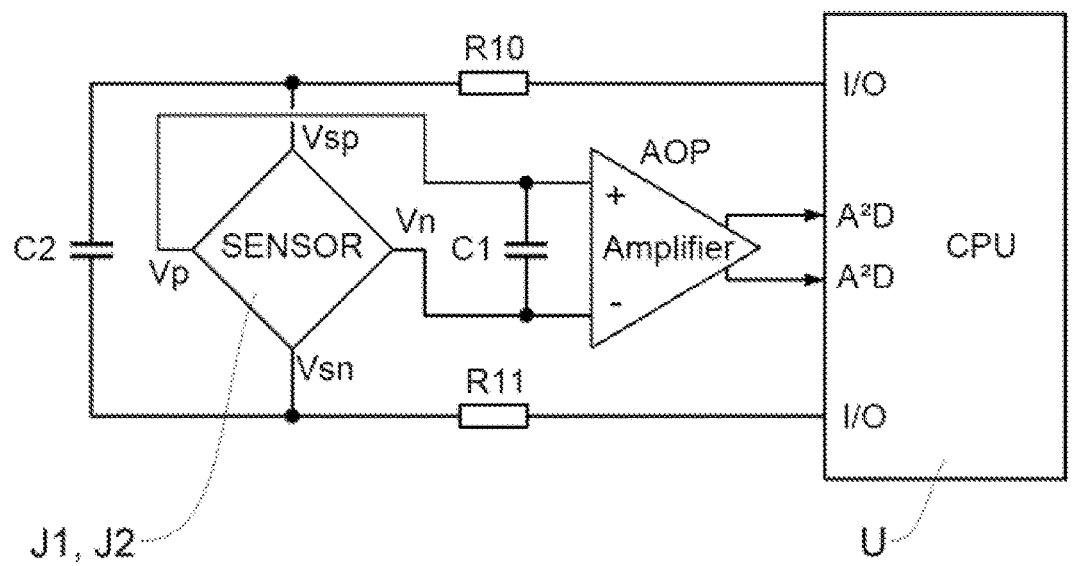
FIG. 3 illustrates the principle of wiring up to the processing unit.

In FIG. 3, the Wheatstone bridge and the 4 coils of a set are represented by a solid diamond.

This Wheatstone bridge configuration makes it possible to attenuate the thermal drifts of the components, to increase the sensitivity of the measurement and to compensate for any coil positioning tolerances.

Advantageously, this configuration allows the coils of one and the same set J1, J2 to themselves generate the magnetic flux through the target C. Thus, the target C may be passive, which is advantageous in relation to a resolver.

Having all of the coils supplied with power simultaneously produces a magnetic flux through target C, the sum of which is roughly constant.

According to another feature, visible in FIGS. 2-4, for each of the Wheatstone bridges of each of the sets J1, J2, the Wheatstone bridge is supplied, between two first diagonal points Vsp, Vsn, with two squarewave signals in phase opposition.

The supply/excitation signal SE applied at Vsn is a squarewave signal, which varies between a low voltage, for example 0 V, and a high voltage, for example 5 V. It is varied periodically with a period, for example, of 20 µs/frequency of 50 kHz corresponding here to the resonant frequency of the sensor 1, as described below, with a duty cycle of 50%. The complementary signal applied at Vsp is the complementary 5 V signal or signal in phase opposition.

The supply/excitation signal SE is advantageously produced by the processing unit U, which processes the signals S1, S2, measured between Vp and Vn, from the coils, to produce the angular position. The same excitation signal SE may advantageously be used to excite the two Wheatstone bridges of the two sets J1, J2.

As illustrated in FIGS. 2-4, according to another feature, the measurement S1, S2 is taken, on the Wheatstone bridge, between two second diagonal points Vp, Vn which are distinct from the first two diagonal points Vsp, Vsn for supply/excitation. This is done for each of the sets J1, J2 to obtain two measurement signals S1, S2.

As illustrated in FIGS. 3-4, according to another feature, the two potentials measured at the two second diagonal points Vp, Vn are transmitted to a differential amplifier AOP, for differential processing of the measurement. In FIG. 4, the amplifiers AOP1 and AOP2 implement a differential amplifier, equivalent to that AOP of FIG. 3.

According to another feature, each Wheatstone bridge/set J1, J2 has a resonant frequency. This resonant frequency is equivalent to the resonant frequency of a coil, assuming that the 4 coils of a set J1, J2 are identical. Thus, advantageously, the excitation signal SE applied to a Wheatstone bridge has a frequency equal to this resonant frequency. This makes it possible to avoid having overly high winding excitation currents for these output ports of the processing unit U.

For this, the sensor 1 comprises a resonator. For each Wheatstone bridge/set J1, J2, the resonator comprises a first capacitor C1 arranged between the two second diagonal points Vp, Vn, used for the excitation SE of the set J1, J2 and a second capacitor C2 arranged between the two first diagonal points Vsp, Vsn, used for the measurements S1, S2. This achieves self-excitation through resonance of the coils. The value of the capacitors C1, C2 is matched to the working frequency of the sensor. Thus, for example, for 50 kHz, C1=C2=100 nF.

These capacitors C1, C2 are advantageously supplemented with resistors R10, R11 connected in series to the points Vsp, Vsn. These resistors make it possible to reduce the excitation currents SE from the processing unit U.

All of this, in relation to the coils of a set J1, J2, makes it possible to "round off" the squarewave signals injected as excitation SE to produce sinusoidal measurement signals S1, S2.

According to another feature, the coils L11, L12, L13, L14, L21, L22, L23, L24 are surface-mount, or SMD, coils. Such SMD coils are mounted on a printed circuit. This allows mounting on a planar printed circuit, advantageously arranged perpendicular to the axis A.

According to another advantageous feature, the printed circuit is coincident with that of the processing unit U or computer and allows integration to be greatly simplified. Thus, for a resolver, necessarily placed at the end of the shaft, and therefore not integrable close to the processing unit U, a 6-wire cable is required between the processing unit U and the resolver. The feature of SMD coils integrated on the printed circuit of the processing unit U advantageously makes it possible to omit this 6-wire cable.

Figure 7:
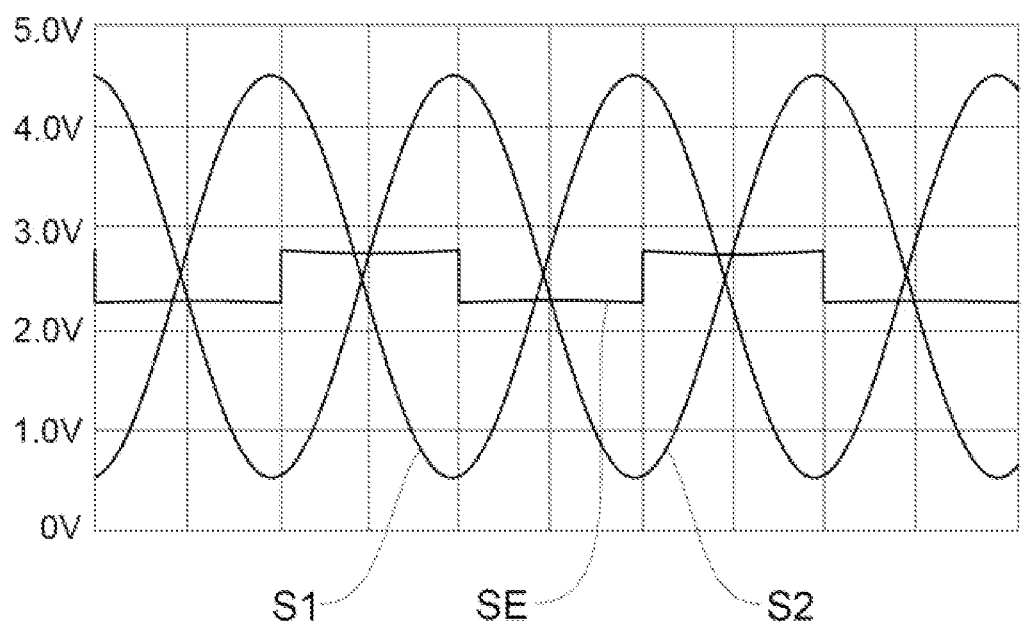

FIGS. 5, 6 and 7 illustrate the squarewave excitation signal SE on the one hand and the signals S1, S2 measured for each of the sets J1, J2 of coils on the other hand. The excitation signal is a squarewave signal with a frequency of 50 kHz. The signals S1 and S2 are sinusoidal signals, in phase opposition with respect to one other, and of the same frequency, equal to the frequency of the excitation signal SE. FIG. 5 shows the signals SE, S1, S2 when the angle/angular position between rotor R and stator S is equal to 0°. A maximum amplitude of the signal S1 and of the signal S2 is observed. FIG. 6 shows the signals when the angle/angular position between rotor R and stator S is almost equal to 45°. A minimum amplitude, close to zero, of the signal S1 and of the signal S2 is observed. FIG. 7 shows the signals when the angle/angular position between rotor R and stator S is equal to 90°. A maximum amplitude of the signal S1 and of the signal S2 is observed, but in phase opposition relative to the same signals S1, S2 of FIG. 5/0° position.

It can be noted that the mechanical and electrical assembly of the coils results in it being possible to distinguish between when the protuberances E are facing the coils L11, L13 or the coils L12, L14. However, due to the mechanical and electrical symmetry, it is not possible to distinguish between when the protuberances E are facing the coils L11, L13 and the coils L13, L11 and likewise to distinguish between when the protuberances E are facing the coils L12, L14 and coils L14, L12. Thus, the angular position determined by the sensor 1, in its configuration with 4 coils per set J1, J2, is obtained modulo 180°.

The measurement signals S1, S2 obtained by the sensor 1 are sinusoidal signals, in phase quadrature and the amplitude of which is indicative of the angular position. In this respect, they are identical to the signals, conventionally called sine and cosine, from a resolver. Thus, according to another feature, these signals S1, S2 may advantageously be processed by means of a processing unit U for a resolver. The sensor 1 advantageously incorporates such a processing unit U for processing/conditioning measurements of resolver type in order to transform the measurement signals S1, S2 into angular position.

An aspect of the invention also relates to a DC brushless motor assembly, comprising a DC brushless motor and an angular position sensor 1 according to an aspect of the invention. Such a motor assembly, provided that the motor comprises an even number of poles at least equal to 4 poles, is accommodated easily owing to the fact that the measurement is obtained modulo 180°.

An aspect of the invention has been illustrated and described in detail in the drawings and the description above. This should be considered as illustrative and given by way of example and not as limiting the invention to this description only. Many variant embodiments are possible.

LIST OF REFERENCE SIGNS

1: sensor,
A: axis,
AOP: operational amplifier,
C: target,
C1, C2: capacitors,
E: protuberance,
J1, J2: set of coils,
L1, L2, L3, L4, 11, L12, L13, L14, L21, L22, L23, L24: coils,
R: rotor,
S: stator,
U: processing unit,
Vp, Vn, Vsp, Vsn: points.

The invention claimed is:

1. An angular position sensor for sensing the angular position of a rotor rotating on an axis relative to a stator, comprising:
 a ferromagnetic target, of substantially ovoid cross section, rotating together with one from among the rotor or the stator; and
 a sensitive element comprising a first set of coils that are angularly evenly distributed, rotating together with the other from among the rotor or the stator, the coils being arranged in line with the target in order to be able to measure a distance from the target so as to deduce therefrom an angular position of the rotor relative to the stator, wherein a cardinality of the first set or of the second set, is equal to 4, and the coils of the first set or the coils of the second set, respectively, are connected in a Wheatstone bridge, said sensor also comprises a resonator, designed to achieve self-excitation through resonance of the coils, comprising a first capacitor arranged between the two second diagonal points used for excitation of a set, and a second capacitor arranged between the first two diagonal points used for measurements of the signals to produce an angular position, each set has a resonant frequency, and an excitation signal applied to a Wheatstone bridge has a frequency equal to said resonant frequency.

2. The sensor according to claim 1, wherein the cross section of the target comprises a number of protuberances equal to half of the cardinality of a set.

3. The sensor according to claim 1, wherein the sensitive element further comprises a second set of coils, of the same cardinality as the first set, the coils of the second set being angularly evenly distributed with respect to one another and angularly interposed midway between the coils of the first set.

4. The sensor according to claim 1, wherein the coils are arranged radially, relative to the axis.

5. The sensor according to claim 1, wherein the coils of a set are connected in magnetic series.

6. The sensor according to claim 1, wherein the cross section of the target has two symmetrical protuberances.

7. The sensor according to claim 1, wherein the coils are surface-mount, SMD, coils mounted on a printed circuit, arranged perpendicular to the axis.

8. The sensor according to claim 1, comprising a resolver-type measurement processing unit.

9. A DC brushless motor assembly, comprising a DC brushless motor and an angular position sensor according to claim 1.

10. The sensor according to claim 1, wherein the Wheatstone bridge is supplied, between two first diagonal points, with two squarewave signals in phase opposition.

11. The sensor according to claim 10, wherein the measurement is taken, on the Wheatstone bridge, between two second diagonal points, distinct from the two first diagonal points.

12. The sensor according to claim 10, further comprising a differential amplifier, for processing the measurement taken between the two second diagonal points.

* * * * *